US010556676B2

(12) United States Patent
Baldwin et al.

(10) Patent No.: US 10,556,676 B2
(45) Date of Patent: *Feb. 11, 2020

(54) HYBRID YOKE

(71) Applicant: Bell Helicopter Textron Inc., Fort Worth, TX (US)

(72) Inventors: Tyler Wayne Baldwin, Keller, TX (US); Kyle Thomas Cravener, Watauga, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/881,980

(22) Filed: Jan. 29, 2018

(65) Prior Publication Data

US 2019/0233095 A1   Aug. 1, 2019

(51) Int. Cl.
*B64C 27/33* (2006.01)
*B64C 27/48* (2006.01)
*B64C 27/35* (2006.01)
*B64C 11/28* (2006.01)
*B64C 29/00* (2006.01)

(52) U.S. Cl.
CPC ............. *B64C 27/33* (2013.01); *B64C 27/35* (2013.01); *B64C 27/48* (2013.01); *B64C 11/28* (2013.01); *B64C 29/0033* (2013.01)

(58) Field of Classification Search
CPC ........ B64C 27/32; B64C 27/33; B64C 27/35; B64C 27/48; B64C 27/50
See application file for complete search history.

(56) References Cited

U.S. PATENT DOCUMENTS

| | | | | |
|---|---|---|---|---|
| 3,330,362 | A * | 7/1967 | Kastan | B64C 27/33 416/100 |
| 4,012,169 | A * | 3/1977 | Mouille | B64C 27/33 416/134 A |
| 4,986,735 | A * | 1/1991 | Robinson | B64C 27/35 416/134 A |
| 5,059,094 | A * | 10/1991 | Robinson | B64C 27/33 416/134 A |
| 5,110,259 | A * | 5/1992 | Robinson | F16F 1/393 144/144.1 |
| 8,360,727 | B2 | 1/2013 | Stamps et al. | |
| 9,085,357 | B2 * | 7/2015 | Davis | B64C 27/32 |
| 9,308,992 | B2 | 4/2016 | Cabrera et al. | |
| 9,505,489 | B2 * | 11/2016 | Sutton | B64C 27/32 |
| 9,802,698 | B2 * | 10/2017 | Capelle | B64C 27/35 |

(Continued)

FOREIGN PATENT DOCUMENTS

DE           3109690 A1 *  9/1982   ............. B64C 27/35

OTHER PUBLICATIONS

Baldwin, Tyler Wayne, et al., "U.S. Appl. No. 15/882,287," filed Jan. 29, 2018.

*Primary Examiner* — Nathaniel E Wiehe
*Assistant Examiner* — Michael K. Reitz
(74) *Attorney, Agent, or Firm* — Winstead PC

(57) ABSTRACT

A hybrid yoke including a center and yoke arms connected to flexure arms. An inboard centrifugal force bearing assembly connects to the yoke arm and a grip and an outboard shear bearing assembly connects to the flexure arm and the grip. In use, the center and yoke arms carry the centrifugal force at a position inboard of the flexure arm.

19 Claims, 6 Drawing Sheets

(56) References Cited

U.S. PATENT DOCUMENTS

2016/0200433 A1 7/2016 Ferrant et al.
2016/0375995 A1* 12/2016 Waldo ................... B64C 27/32
            416/204 R

* cited by examiner

HYBRID YOKE

CROSS-REFERENCE TO RELATED APPLICATIONS

This patent application is related to U.S. Patent Application Publication US 2019/0233096 A1, entitled Tri-Hybrid Yoke, which is incorporated herein by reference in its entirety.

BACKGROUND

This section provides background information to facilitate a better understanding of the various aspects of the disclosure. It should be understood that the statements in this section of this document are to be read in this light, and not as admissions of prior art.

Rotor systems of rotorcraft and tiltrotor aircraft include inboard and outboard bearing assemblies that connect rotor blades to a yoke. The yoke is connected by a hub to a drive mast driven by a power source. The yoke is often manufactured of composite material instead of metal for weight savings. The inboard and outboard bearing assemblies accommodate forces acting on the rotor blades allowing each rotor blade to flex with respect to the yoke/mast and other rotor blades. A particular distance between the inboard and outboard bearing assemblies is dependent on aircraft configuration where each configuration has an optimal distance for that particular aircraft's loads and dynamics. Typically, the outboard bearing assembly includes a centrifugal force ("CF") bearing and a shear bearing connected to both the rotor blade and a tip of a yoke arm while the inboard bearing assembly includes a shear bearing connected to both the rotor blade and the yoke in a cut-out proximate the drive mast. CF loads can be significantly greater than shear loads. The CF bearing which accommodates the CF load is typically outboard at the tip of the yoke arm since the cut-out in the yoke compromises the strength of the yoke and provides a common yoke failure point.

SUMMARY

An example of a hybrid yoke for a rotorcraft includes a center yoke including a yoke arm, where the yoke arm is a unitary portion of the center yoke, a flexure arm connected to the yoke arm, a centrifugal force ("CF") joint positioned within the yoke arm proximate the center yoke and inboard of the flexure arm, and the CF joint, the yoke arm, and the center yoke carry a CF load upon rotation of the hybrid yoke.

An example of a rotor blade assembly of a rotorcraft includes a center yoke including a central aperture, a drive shaft connected to the center yoke at the central aperture, a yoke arm, formed by the center yoke, extending radially from the central aperture, a flexure attached to the yoke arm opposite the center yoke, a centrifugal force ("CF") bearing connected to the yoke arm, a rotor blade connected to the CF bearing, an outboard shear bearing connected to the flexure and the rotor blade, and a CF load path of the rotor blade assembly through the rotor blade, the CF bearing, the yoke arm, and the center yoke.

An example of a hybrid yoke for a rotorcraft includes a center yoke including a yoke arm, a flexure arm connected to the yoke arm, a cut-out in the yoke arm, inboard of the flexure arm, including a centrifugal force ("CF") fitting, a first curved surface formed in the CF fitting, an inboard beam including a shaft extending from a bridge and a second curved surface in the bridge opposite the shaft, a CF bearing held by and between the first curved surface and the second curved surface, and the CF bearing is axially centered within the first curved surface and the second curved surface when the CF bearing is under compression by a CF load.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
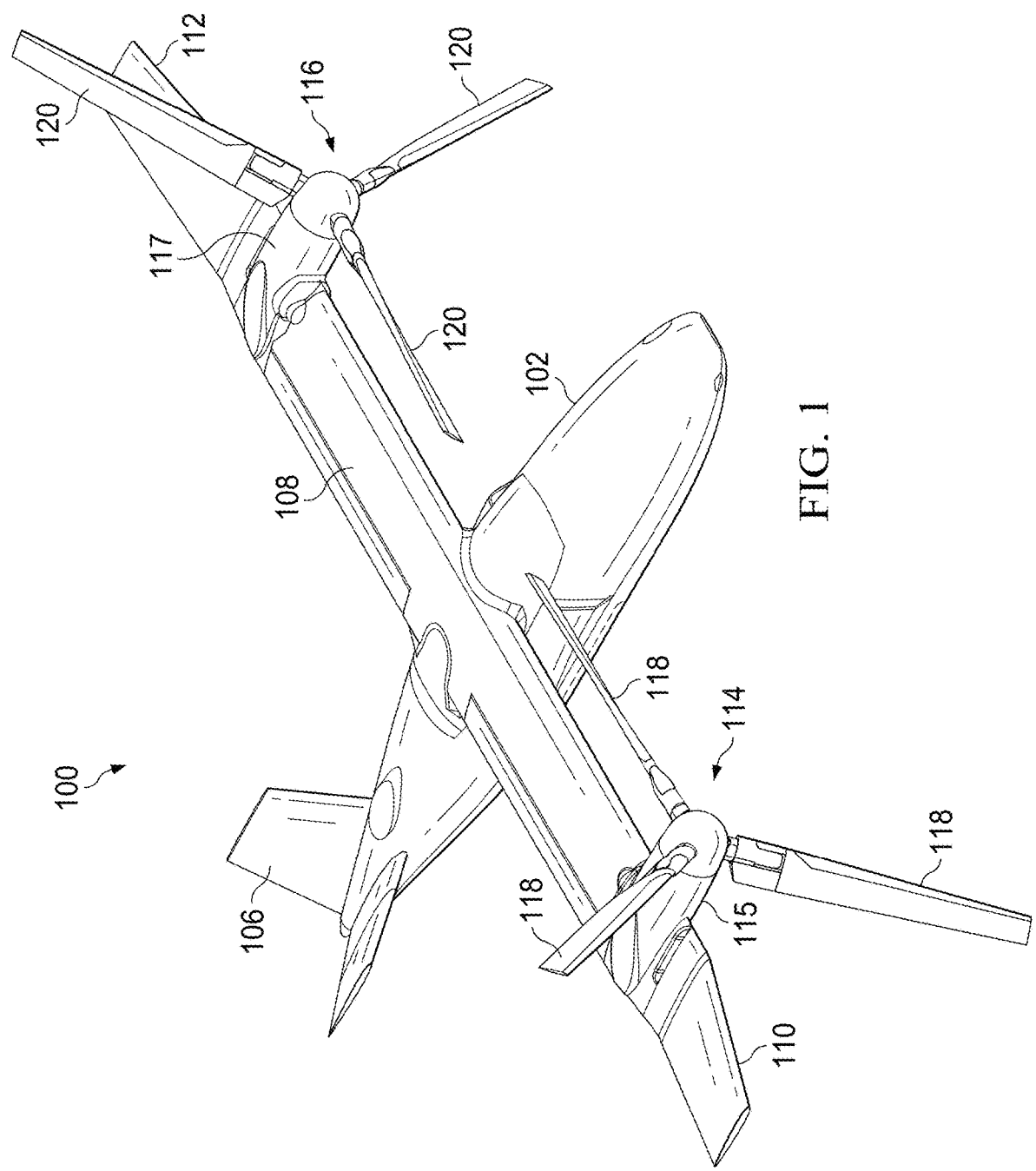
FIG. 1 is a perspective view of a tiltrotor aircraft in a flight ready position according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

Figure 2:
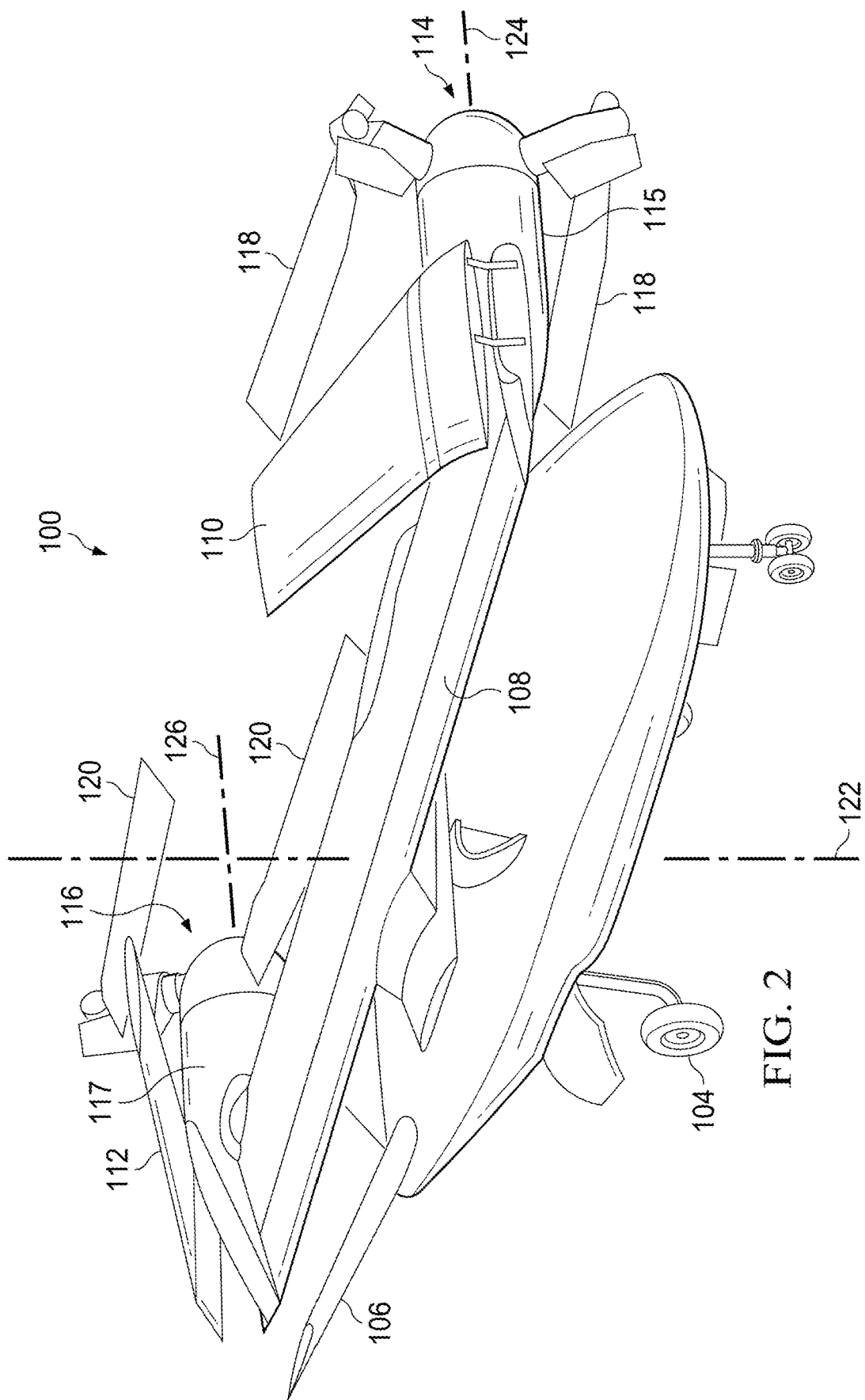
FIG. 2 is a perspective view of a tiltrotor aircraft in a stowed position according to aspects of the disclosure.

Referring to FIGS. 1 and 2, an illustrative tiltrotor aircraft 100 is shown. Tiltrotor aircraft 100 includes fuselage 102, landing gear 104, tail member 106, wing 108, wing tip 110, wing tip 112, rotor system 114, and rotor system 116. Rotor system 114 is connected to nacelle 115 located on an end portion of wing 108 proximate wing tip 110, while rotor system 116 is connected to nacelle 117 located on an opposite end portion of wing 108 proximate wing tip 112. Wing tip 110 is pivotable at a location on wing 108 outboard of nacelle 115. Wing tip 112 is pivotable at a location on wing 108 outboard of nacelle 117. Nacelles 115 and 117 are pivotable between a helicopter mode where the rotor systems are generally vertical and an airplane mode where the rotor systems are generally horizontal. Nacelle 115 and nacelle 117 are substantially symmetric of each other about fuselage 102. Rotor system 114 includes a plurality of foldable rotor blades 118. Rotor system 116 includes a plurality of foldable rotor blades 120. Rotor blades 118 and 120 may rotate in opposite directions to cancel the torque associated with the operation of each rotor system 114 and 116. The angle of the pivotable nacelles 115 and 117 relative to the wing, as well as the pitch of rotor blades 118 and 120, can be adjusted in order to selectively control direction, thrust, and lift of tiltrotor aircraft 100. Further, rotor systems 114 and 116 are illustrated in the context of tiltrotor aircraft 100; however, a singular rotor system with foldable or non-foldable rotor blades can be implemented on other non-tilting rotor and helicopter rotor systems. It should also be appreciated that teachings from tiltrotor aircraft 100 may apply to other aircraft such as airplanes and unmanned aircraft which would benefit from folding rotor blades.

Fuselage 102 represents the body of tiltrotor aircraft 100 and may be coupled to rotor systems 114 and 116 such that the rotor systems with rotor blades 118 and 120 may move tiltrotor aircraft 100 through the air. Landing gear 104 supports tiltrotor aircraft 100 when tiltrotor aircraft 100 is landing or when tiltrotor aircraft 100 is at rest on the ground. Vertical axis 122 is generally perpendicular to the longitudinal axis of the wing and is generally positioned at the intersection of the fuselage and the wing. FIG. 1 represents tiltrotor aircraft 100 in operational flying position in an airplane mode. FIG. 2 represents tiltrotor aircraft 100 in a stowed position where rotor blades 118 have been folded generally parallel with each other and rotor blades 120 have been folded generally parallel with each other in order to reduce the profile of the aircraft. In the stowed position, wing 108 is swiveled approximately 90° to generally align with fuselage 102.

Generally each rotor system includes a drive mast driven by a power source. A rotor system includes a yoke indirectly connected to the drive mast with a hub assembly constant velocity joint and rotor blades indirectly connected to the yoke with inboard and outboard bearing assemblies. The bearing assemblies accommodate forces acting on the rotor blades allowing each rotor blade to flex with respect to the yoke/mast and other rotor blades. The weight of the rotor blades and the lift of rotor blades may result in transverse forces on the yoke and other components. Examples of transverse forces may include forces resulting from leading, lagging, and coning of the rotor blades. Leading and lagging generally refers to the movement of a rotor blade in the plane of rotation. Coning generally refers to the upward and downward flexing of a rotor blade out of the plane of rotation due to lift forces acting on the rotor blade. The rotor blades may be subject to other forces, such as axial and feathering forces. Axial forces generally refer to the centrifugal force on the rotor blades during rotation of the rotor blades. Feathering forces generally refer to forces resulting from twisting motions that cause a rotor blade to change pitch. The power source, drive mast, and yoke are components for transmitting torque. The power source may include a variety of components including an engine, a transmission, and differentials. In operation, the drive mast receives torque from the power source and rotates the hub and yoke. Rotation of the yoke causes the rotor blades to rotate with the drive mast and yoke.

Figure 3A:
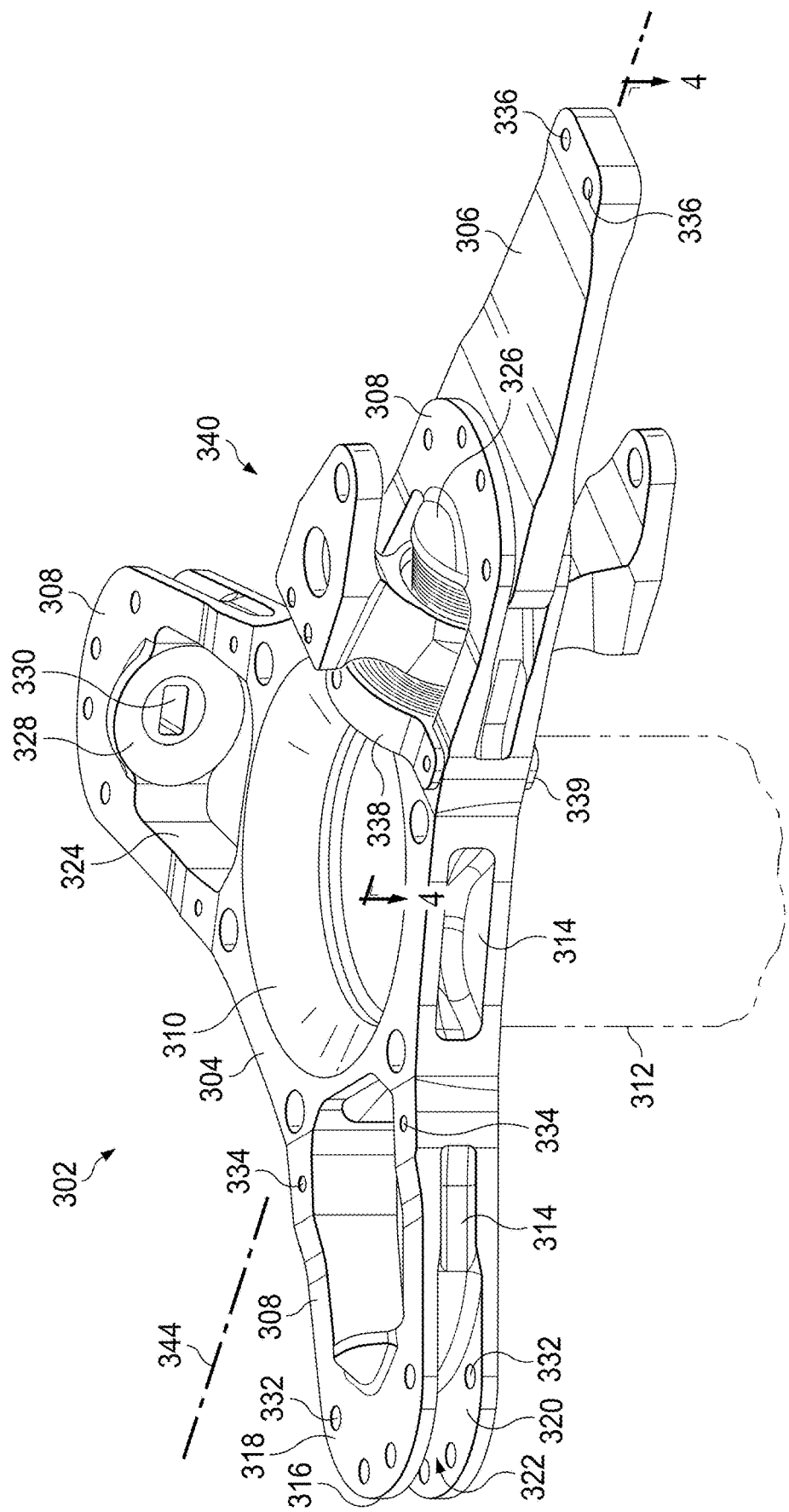
FIG. 3A is a perspective view of a hybrid yoke according to one or more aspects of the disclosure.
Figure 3B:
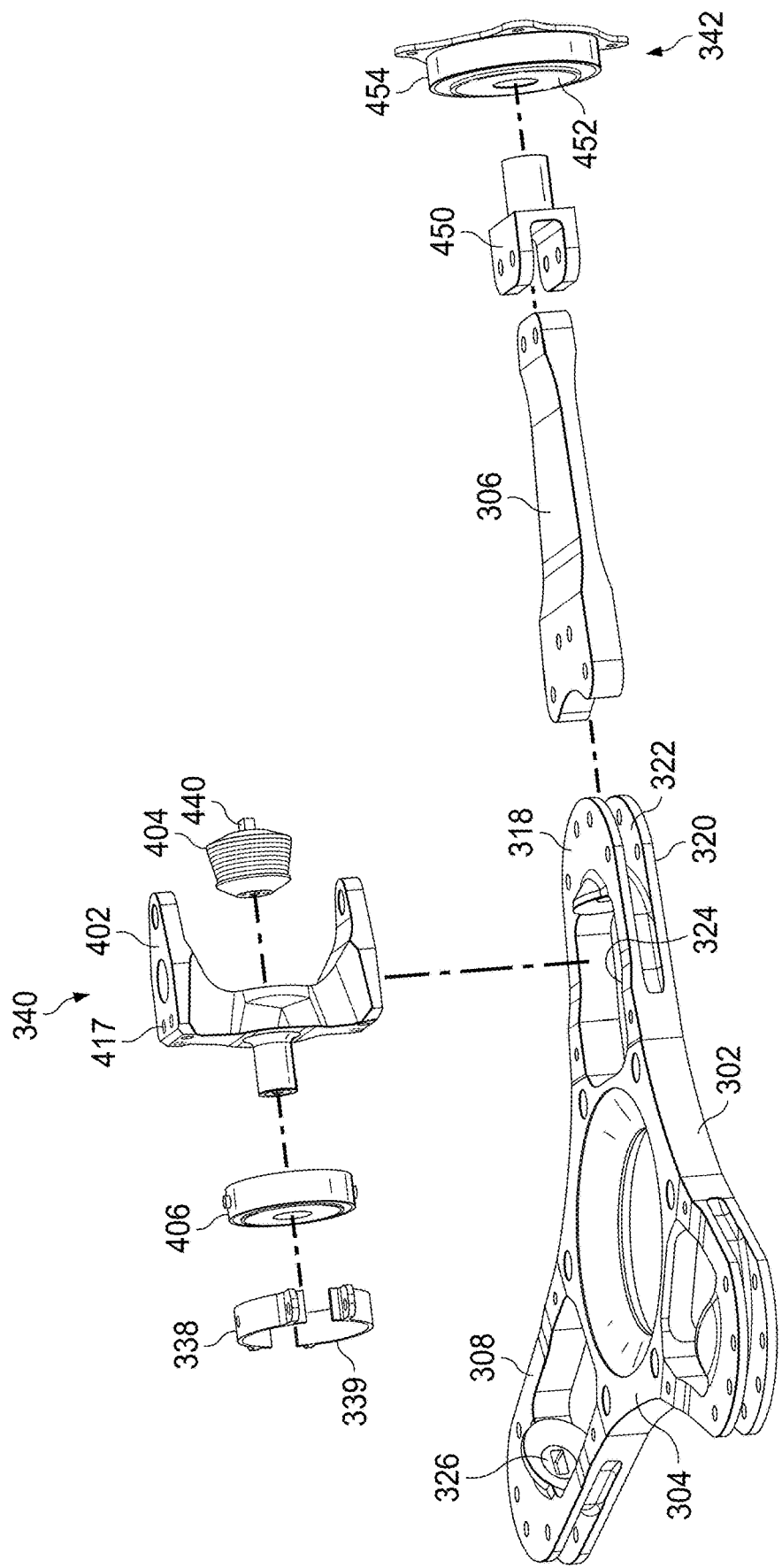
FIG. 3B is an exploded perspective view of a hybrid yoke according to one or more aspects of the disclosure.

Referring to FIGS. 3A and 3B, hybrid yoke 302 is shown. Each rotor system 114, 116 includes a separate hybrid yoke. Hybrid yoke 302 includes a metal yoke center attached to composite flexure arms. The "hybrid" combination of a metal center attached to composite flexure arms provides the strength of metal to the yoke center and the flexibility of composite to the flexure arms. It should be understood that different metal and composite combinations for the center and the flexure arms may be possible. In the interest of clarity, a single hybrid yoke is described herein with the understanding that tiltrotor aircraft 100 includes a pair of similarly configured hybrid yokes.

Hybrid yoke 302 includes yoke center 304 and a plurality of flexure arms 306. For strength purposes, yoke center 304 is metal and may be manufactured of, for example, aluminum, steel, or titanium.

Each flexure arm 306 is manufactured of a flexible composite material. For flexibility, each flexure arm 306 may be, for example, a composite part constructed from reinforcement material, such as fiberglass suspended in epoxy resin or a rubber compound. Reinforcement material within flexure arm 306 can be oriented to customize how flexure arm 306 responds to certain loads. For example, fiber reinforcement material can be provided at various angles to customize the stiffness of flexure arm 306 in different directions. Reinforcement material can be arranged within flexure arm 306 such that it is stiff axially and laterally to resist centrifugal and lead/lag forces, however flexible vertically in a direction generally parallel with the drive mast to permit coning. Actual flexibility values provided by the constituent materials and arrangement of reinforcement layers are dependent on a particular aircraft's loads and dynamics.

Yoke center 304 includes a plurality of yoke arms 308 extending radially from central aperture 310. Each yoke arm 308 is formed with yoke center 304 such that each yoke arm 308 is a unitary portion of the yoke center. Each yoke arm 308 is generally equally spaced from each other around central aperture 310. Each yoke arm 308 connects to a flexure arm 306. A rotor blade is connected to each yoke arm 308 and flexure arm 306 via inboard and outboard bearing assemblies. For example in the three rotor blade configuration shown in rotor systems 114 and 116, 120° separates each yoke arm and thus each rotor blade. It should also be appreciated that teachings regarding hybrid yoke 302 can apply to rotor systems having greater or fewer rotor blades. It should also be appreciated that teachings regarding hybrid yoke 302 can apply to folding and non-folding rotor systems.

Hybrid yoke 302 is connected to drive mast 312 through central aperture 310 via a hub spring assembly and constant velocity joint. Yoke center 304 and yoke arms 308 include weight pockets 314. Weight pockets 314 reduce the overall weight of hybrid yoke 302 without comprising the strength of yoke center 304. At end 316 of each yoke arm 308, yoke arm 308 includes tangs 318, 320. Tangs 318, 320 define space 322 between them. Space 322 is sized to engage flexure arm 306. Tangs 318, 320 provide a double shear connection to flexure arm 306. Alternatively, flexure arm 306 may include a set of tangs sized to engage a solid end 316 to provide the double shear connection. Each yoke arm 308 includes mounting holes 332. Mounting holes 332 are used to connect yoke arm 308 to flexure arm 306. The connection between yoke arm 308 and flexure arm 306 does not carry any CF load. Each yoke arm 308 includes mounting holes 334. Mounting holes 334 are used to connect clamp plates 338, 339 to yoke arm 308. Clamp plates 338, 339 are adjacent to and hold a shear bearing of inboard bearing assembly 340. Each flexure arm 306 includes mounting holes 336. Mounting holes 336 are used to connect flexure arm 306 to outboard bearing assembly 342.

Each yoke arm 308 includes cut-out 324. Cut-out 324 extends from proximate central aperture 310 to tangs 318, 320. Cut-out 324 is sized to allow inboard bearing assembly 340 to fit within cut-out 324. Centrifugal force ("CF") fitting 326 is integrally formed with yoke arm 308. CF fitting 326 is a unitary portion of the yoke arm that has a curved surface forming a conical cavity. CF fitting 326 includes cavity 328. Cavity 328 is conical or parabolic shaped and includes slot 330. Each rotor blade connected to yoke arm 308 and flexure arm 306 shares central longitudinal axis 344 with yoke arm 308 and flexure arm 306. The central longitudinal axis of a rotor blade may also be referred to as a blade pitch change axis.

Figure 4:
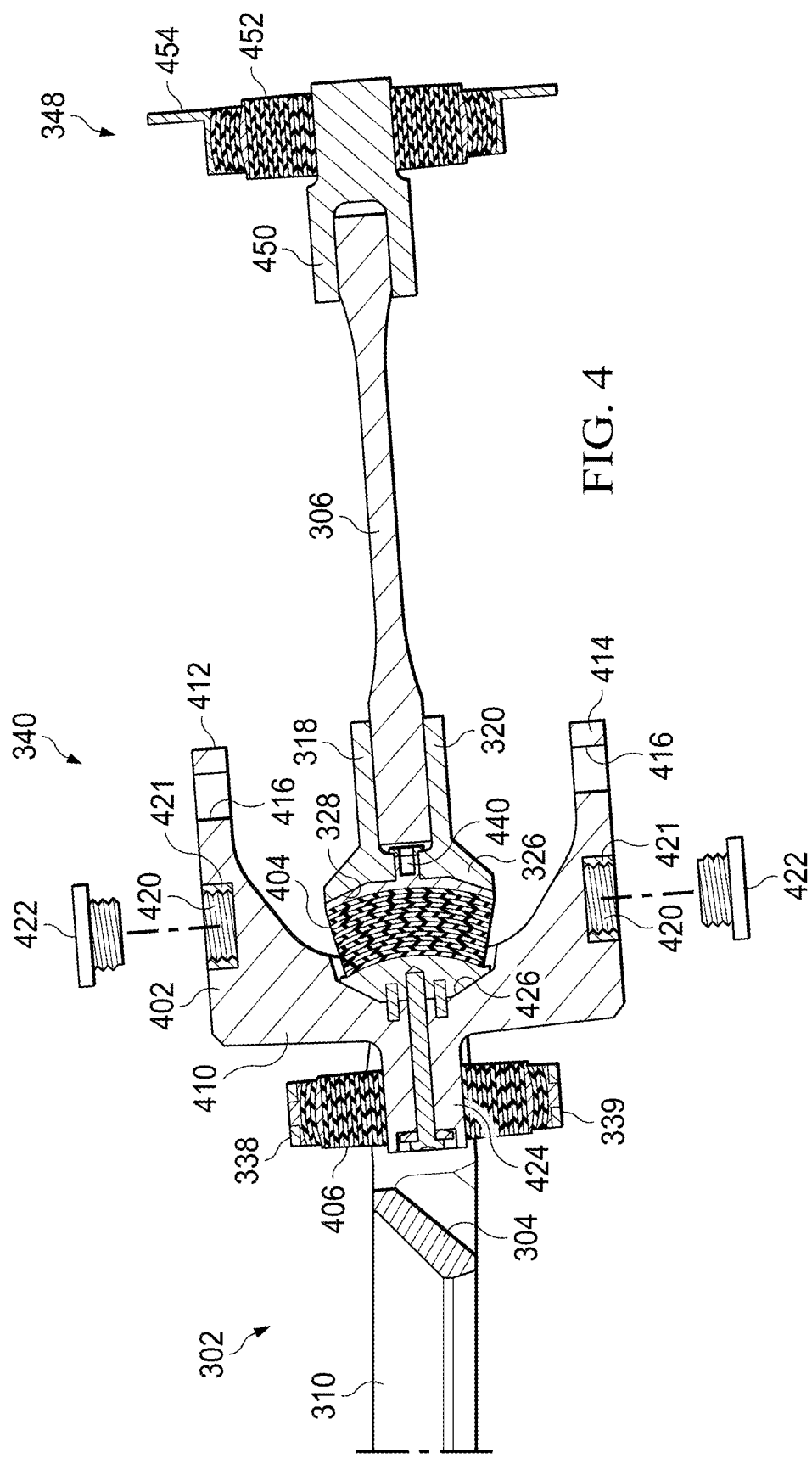
FIG. 4 is a partial sectional view of a hybrid yoke and inboard bearing assembly according to one or more aspects of the disclosure taken along line 4-4 of FIG. 3A.

Referring to FIG. 4, inboard bearing assembly 340 is shown connected to hybrid yoke 302. Inboard bearing assembly 340 includes inboard beam 402, CF bearing 404, and shear bearing 406. The CF and shear bearings are generally elastomeric bearings constructed from a rubber type material that absorb vibration and provide for limited movement of the rotor blades relative to the hybrid yoke and drive mast.

Inboard beam 402 includes bridge 410. Tangs 412, 414 are vertically aligned and extend from bridge 410. Tangs 412, 414 include mounting holes 416, 417. Mounting holes 416, 417 are used to connect grip 502 (FIG. 5) to inboard beam 402. As further discussed below, grip 502 is also connected to an outboard beam which is mounted to flexure arm 306. Tangs 412, 414 include CF mounting hole 420. CF bolt 422 is sized to engage CF bushing 421 seated within CF mounting hole 420 and is used to connect the grip to inboard beam 402. CF bolts 422, CF bushings 421, and CF mounting holes 420 are axially aligned in between tangs 412, 414. Inboard beam 402 includes shaft 424 extending from bridge 410 toward central aperture 310. Shear bearing 406 is attached to shaft 424, for example by vulcanization or adhesive. Clamp plates 338, 339 and shaft 424 hold or constrain shear bearing 406. Inboard beam 402 includes cavity 426 concentrically aligned with shaft 424. Cavity 426 is conical or parabolic shaped and positioned on bridge 410 opposite of shaft 424. Inboard beam 402 is connected to yoke arm 308 via CF bearing 404. CF bearing 404 is held by and between the curved surfaces of cavity 426 and cavity 328 of CF fitting 326. The curved surfaces of cavity 426 and cavity 328 tend to axially center CF bearing 404 within the cavities when CF bearing 404 is under compression from CF loads. It should be understood that, an axially centered CF bearing is when the central longitudinal axis of the CF bearing generally intersects the center points of the curved surfaces of cavity 328 and cavity 426. CF bearing 404 includes tab 440. Tab 440 is sized to engage slot 330. The engagement of tab 440 with slot 330 prevents rotation of CF bearing 404 with respect to yoke arm 308. As an alternative, CF fitting 326, cavity 328, and slot 330 may be replaced with a clevis extending from CF bearing 404 for connection to tangs 318, 320 to provide the anti-rotation functionality. Outboard bearing assembly 342 includes spindle 450 attached to flexure arm 306. Spindle bearing 452 is mounted to spindle 450 and outboard beam 454 holds spindle bearing 452.

Figure 5:
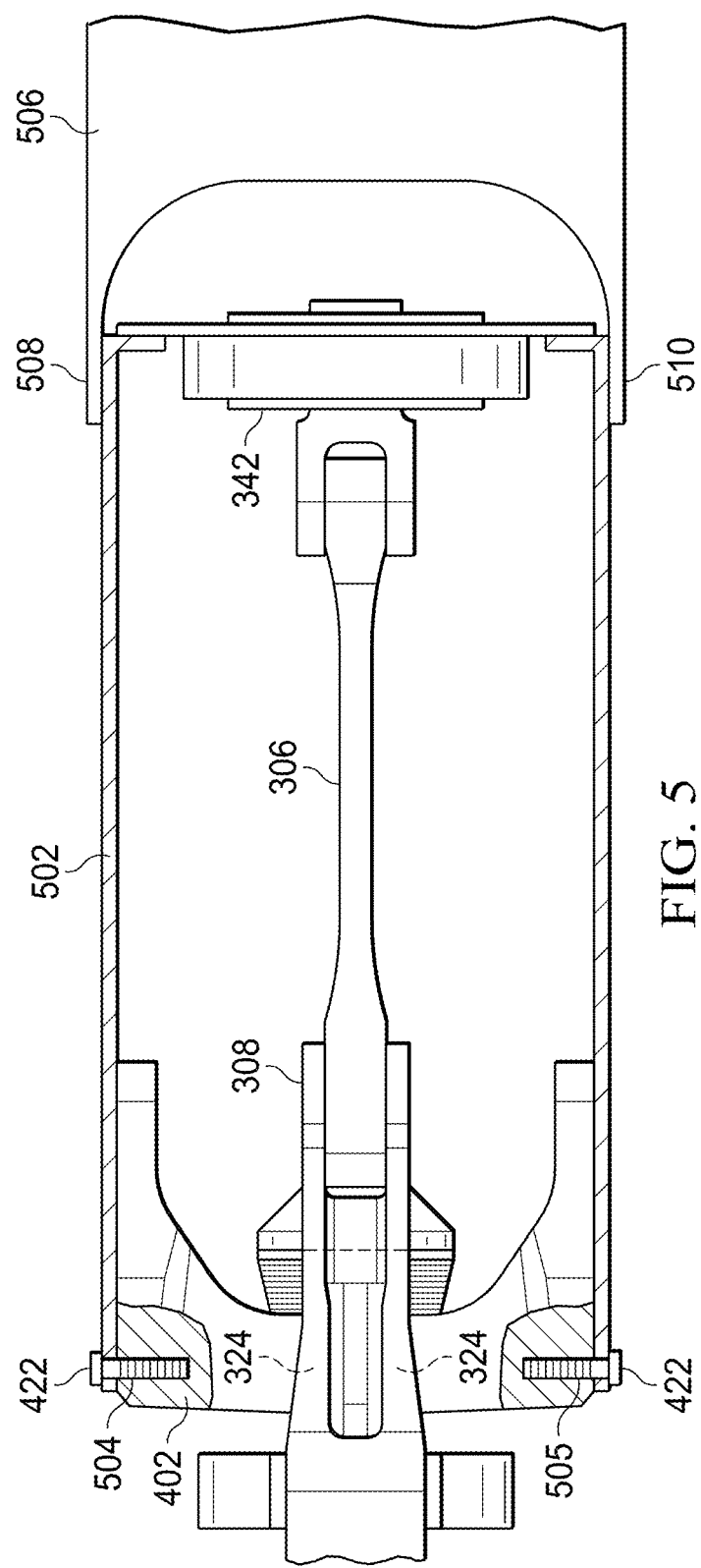
FIG. 5 is a schematic of a rotor blade connected to a hybrid yoke according to one or more aspects of the disclosure.

Referring to FIG. 5, a schematic of a rotor blade assembly including a rotor blade connected to hybrid yoke 302 is shown. Inboard beam 402 of inboard bearing assembly 340 extends through cut-out 324 in yoke arm 308 and is connected to grip 502. CF joints 504, 505 connect grip 502 to inboard beam 402 with CF bolt 422 and CF bushing 421. CF bolt 422 within CF bushing 421 is manufactured to higher tolerances than the mounting hardware used in mounting holes 416, 417 that also connect inboard beam 402 to grip 502. As a result, at CF joints 504, 505 only CF bolts 422 or CF bushings 421 carry the CF load from grip 502 through to inboard beam 402. The mounting hardware used in mounting holes 416, 417 that also connect inboard beam 402 to grip 502 do not carry CF load. CF joints 504, 505 are positioned within cut-out 324 of yoke arm 308 and inboard of flexure arm 306. Outboard bearing assembly 342 connects flexure arm 306 to grip 502 and blade tangs 508, 510 of rotor blade 506. Alternatively, grip 502 is not present and rotor blade 506 extends to inboard bearing assembly 340 where CF joints 504, 505 connect blade tangs 508, 510 to inboard beam 402 while rotor blade 506 connects to outboard bearing assembly 342 outboard of blade tangs 508, 510.

Outboard bearing assembly 342 includes a shear bearing. The connection between flexure arm 306 and outboard bearing assembly 342 does not carry any CF load. The CF load path of rotor blade 506 is from blade tangs 508, 510 to grip 502; through CF bolts 422 or CF bushings 421 of CF joints 504, 505; to inboard beam 402; through CF bearing 404 to yoke arm 308 and center yoke 304. Alternatively, in the absence of the grip, the CF load path of rotor blade 506 is from blade tangs 508, 510; through CF bolts 422 or CF bushings 421 of CF joints 504, 505; to inboard beam 402; through CF bearing 404 to yoke arm 308 and center yoke 304. The connection of grip 502 or rotor blade 506 to tangs 412, 414 of inboard beam 402 provides a double shear condition. The double shear condition prevents any rotational moment about the connection of the grip or rotor blade to the inboard beam at each CF bolt 422 created by centrifugal forces acting on the rotor blade during blade assembly rotation. The metal material of hybrid yoke 302, namely yoke arm 308 and yoke center 304, provide greater strength than a yoke manufactured entirely of composite material. The stronger hybrid yoke 302 is capable of withstanding the CF loads via an inboard bearing assembly.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, as understood by a person of ordinary skill in the art.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:
1. A hybrid yoke for a rotorcraft, comprising:
   a center yoke including a yoke arm, where the yoke arm is a unitary portion of the center yoke;
   a flexure arm connected to the yoke arm, wherein the center yoke and the yoke arm are constructed of a metal and the flexure arm is constructed of a flexible composite material;

a centrifugal force ("CF") joint positioned within the yoke arm proximate the center yoke and inboard of the flexure arm;
an inboard beam including a first tang and a second tang extending from a bridge, where the first tang is vertically aligned with the second tang;
a shaft extending from the bridge toward the center yoke;
a cavity in the bridge opposite the shaft, a CF bearing held by and between the cavity and the yoke arm;
a clamp plate attached to the yoke arm; and
an inboard shear bearing attached to the shaft and held by the clamp plate; and
an outboard bearing assembly coupled to the flexure arm and located outboard of the CF joint wherein the hybrid yoke is configured to connect to a rotor blade at the CF joint and the outboard bearing assembly, whereby in use a CF load path is from the rotor blade to the CF joint, the yoke arm, and the center yoke, and the CF load path does not include the flexure arm or the outboard bearing assembly or a grip.

2. The hybrid yoke of claim 1, wherein the yoke arm further comprises a cut-out proximate the center yoke and the CF joint is positioned within the cut-out.

3. The hybrid yoke of claim 1, wherein the yoke arm includes a CF fitting and the CF fitting is a unitary portion of the yoke arm.

4. The hybrid yoke of claim 1, wherein the center yoke and the yoke arm further comprise weight pockets.

5. The hybrid yoke of claim 1, further comprising:
a cut-out in the yoke arm; and
a CF fitting, where the CF fitting is a unitary portion of the yoke arm within the cut-out.

6. The hybrid yoke of claim 1, further comprising:
a tab extending from the CF bearing engaged with a slot in the yoke arm.

7. The hybrid yoke of claim 1, wherein the yoke arm further comprises:
a cut-out proximate the center yoke;
a CF fitting formed by the cut-out, where the CF fitting is a unitary portion of the yoke arm within the cut-out; and
a weight pocket.

8. The hybrid yoke of claim 1, wherein the flexure arm is connected to the yoke arm by a double shear connection.

9. A rotor blade assembly of a rotorcraft, comprising:
a center yoke including a central aperture;
a drive shaft connected to the center yoke at the central aperture;
a yoke arm, formed by the center yoke, extending radially from the central aperture;
a flexure attached to the yoke arm opposite the center yoke;
a centrifugal force ("CF") bearing connected to the yoke arm inboard of the flexure;
a rotor blade connected to the CF bearing without a grip between the rotor blade and the CF bearing;
an outboard bearing assembly comprising an outboard shear bearing, the outboard bearing assembly connected to the flexure and the rotor blade;
an inboard beam including a first tang and a second tang extending from a bridge, where the first tang is vertically aligned with the second tang;
a shaft extending from the bridge toward the center yoke;
a cavity in the bridge opposite the shaft, the CF bearing held by and between the cavity and the yoke arm;
a clamp plate attached to the yoke arm;
an inboard shear bearing attached to the shaft and held by the clamp plate; and
a CF load path of the rotor blade assembly through the rotor blade, the CF bearing, the yoke arm, and the center yoke, wherein the CF load path does not include the flexure, the outboard bearing assembly, or the grip.

10. The rotor blade assembly of claim 9, wherein the yoke arm further comprises a cut-out proximate the center yoke and the CF bearing is connected to the yoke arm in the cut-out.

11. The rotor blade assembly of claim 9,
wherein the CF bearing is centered between the cavity in the bridge and a conical cavity in the yoke arm when the CF bearing is under compression by a CF load created by rotation of the rotor blade assembly.

12. The rotor blade assembly of claim 9, wherein the yoke arm further comprises:
a cut-out proximate the center yoke and the CF bearing extends through the cut-out;
a CF fitting formed in the cut-out; and
a weight pocket.

13. The rotor blade assembly of claim 9, wherein the flexure is attached to the yoke arm by a double shear connection.

14. The rotor blade assembly of claim 9, wherein the center yoke and the yoke arm are constructed of a metal and the flexure is constructed of a flexible composite material.

15. The rotor blade assembly of claim 9, wherein the center yoke and the yoke arm are constructed of a metal and the flexure is constructed of a flexible composite material; and
the flexure is attached to the yoke arm by a double shear connection.

16. A hybrid yoke for a rotorcraft, comprising:
a center yoke including a yoke arm;
a flexure arm connected to the yoke arm, wherein the center yoke and the yoke arm are constructed of a metal and the flexure arm is constructed of a flexible composite material;
a cut-out in the yoke arm, inboard of the flexure arm, including a centrifugal force ("CF") fitting;
a first curved surface formed in the CF fitting;
an inboard beam including a shaft extending from a bridge and a second curved surface in the bridge opposite the shaft;
a CF bearing held by and axially centered between the first curved surface and the second curved surface;
a clamp plate attached to the yoke arm;
an inboard shear bearing attached to the shaft and held by the clamp plate; and
an outboard bearing assembly connected to the flexure arm wherein the hybrid yoke is configured to connect to a rotor blade at the CF bearing and the outboard bearing assembly whereby in use a CF load path of the rotor blade is from the rotor blade to the CF bearing, to the yoke arm and the center yoke, and the CF load path does not include the flexure arm or the outboard bearing assembly or a grip.

17. The hybrid yoke of claim 16, further comprising a slot in the first curved surface and a tab extending from the CF bearing engaged with the slot.

18. The hybrid yoke of claim 16, wherein the inboard beam, the yoke arm, the center yoke, and the CF bearing carry a CF load upon rotation of the hybrid yoke.

19. The hybrid yoke of claim 16, wherein the flexure arm is connected to the yoke arm by a double shear connection.

* * * * *